United States Patent [19]

Miller et al.

[11] Patent Number: 4,655,415
[45] Date of Patent: Apr. 7, 1987

[54] HELICOPTER FLOTATION

[75] Inventors: Ralph A. Miller, Monmouth Beach; Frank J. Brown, Brick, both of N.J.

[73] Assignee: The Garrett Corporation, Los Angeles, Calif.

[21] Appl. No.: 694,883

[22] Filed: Jan. 24, 1985

[51] Int. Cl.⁴ .............................................. B64C 25/26
[52] U.S. Cl. .................................... 244/105; 244/107; 244/100 A; 244/17.17
[58] Field of Search ............... 244/100 R, 100 A, 101, 244/105, 107, 108, 17.17; 114/68

[56] References Cited
U.S. PATENT DOCUMENTS 3,506,222 4/1970 Anderson ............................ 244/101
3,507,466 4/1970 LaFleur ........................... 244/100 A

FOREIGN PATENT DOCUMENTS 1607 5/1979 European Pat. Off. ........ 244/100 A

Primary Examiner—Sherman D. Basinger
Assistant Examiner—Rodney Corl
Attorney, Agent, or Firm—Terry L. Miller; Albert J. Miller

[57] ABSTRACT

A helicopter flotation pack includes an inflatable flotation bladder secured to an intermediate structural member which includes means for attachment to a helicopter landing skid. The structural member cooperatively defines a sheltered chamber for inflation apparatus and also carries an environmentally protective cosmetic cover which advantageously directs the deployment of the flotation bladder during inflation. The nature of the interconnection between the inflation bladder and structural member is such that both in-flight stability and flotation load-bearing capacity of the flotation bladder are increased.

24 Claims, 5 Drawing Figures

HELICOPTER FLOTATION

BACKGROUND OF THE INVENTION

The field of the present invention is apparatus and methods for buoyantly supporting an aircraft upon the surface of a body of water. More particularly, the present invention relates to flotation bags which are normally disposed deflated upon the landing skids of a helicopter, and which are inflated in order to support the helicopter when ditching or landing on water is anticipated.

Conventionally, helicopters making flights over water have employed flotation bags assembled to and packed in a deflated condition upon the landing skids of the helicopters. Typically, such conventional flotation bags are attached directly to the helicopter landing skids, and are then folded or packed tightly within flexible fabric covers. Such an assembly procedure requires considerable time during which the helicopter is unavailable for service. Periodic inspection and maintenance of the flotation bags also requires that the helicopter be removed from service while the bags are unpacked, inspected, repaired or replaced, if necessary, and then repacked on the landing skids.

Another consideration with conventional flotation bags is the possibility for one or more of the bags to become trapped between the helicopter fuselage and a landing skid during inflation. This possibility is exacerbated when the flotation bags are deployed while the helicopter is exposed to a cross wind. In such a situation, one or more of the flotation bags on the upwind side of the helicopter may be blown between the helicopter fuselage and the upwind landing skid as they are inflated. When these flotation bags reach full inflation they are trapped beneath the helicopter. If the helicopter is subsequently forced to ditch upon water, the buoyancy provided by the flotation bags may be sufficiently misplaced with respect to the center of gravity of the helicopter that capsizing is more likely, or is certain to occur.

Yet another shortcoming of conventional helicopter flotation bags is their propensity to flutter or oscillate when inflated with the helicopter in flight. In the event the bags become accidentally inflated in flight, or are inflated as a precaution against an engine difficulty which is transient, it is desirable for the helicopter to be able to maintain a relatively high airspeed despite the inflated flotation bags. In many cases, conventional flotation bags prohibit the use of the full speed capability of the helicopter with the bags inflated because of flutter of the bags which could cause structural damage to the helicopter, or destroy the flotation bags, or both.

SUMMARY OF THE INVENTION

In view of the shortcomings of conventional helicopter flotation bags, this invention has as an object the provision of integral or modular flotation packs which contain one or more deflated and folded flotation bags secured to a structural member providing a foundation not only for the transmittal of flotation forces from the bag to the helicopter, but also for an inflation system and for a covering for environmental protection and cosmetic enhancement. The packs are to include provision for attachment thereof to the landing skids of a helicopter in a much shorter time than is required for assembly and packing of conventional flotation bags.

Another object for this invention is to provide a helicopter flotation bag with an environmental and cosmetic cover which by its yieldable shape-retaining nature directs the inflating bag outwardly away from the helicopter fuselage. Desirably, the cover provides a barrier or fence inhibiting movement of the inflating flotation bag into a position of entrapment between the helicopter fuselage and a landing skid.

Yet another object for this invention is to provide a structural attachment of the flotation bags to a helicopter which utilizes inflation forces to tension the bags to a more stable condition during helicopter flight. Desirably, the structure of the inflatable flotation bag cooperates with a structural foundation member to define a relatively large area wherein inflation forces are deliberately opposed to potential buoyancy forces to preload the resilient inflated bag in a stabilizing manner.

Accordingly, the present invention provides a helicopter flotation pack comprising an elongate structural member including means for attachment to a helicopter landing skid, a flexible fluid-distensible flotation bladder secured to the structural member, means for inflating the flotation bladder, and environmental cover means secured to the structural member for constraining the bladder when the latter is deflated and folded upon the structural member.

The present invention further provides a helicopter flotation pack of the above-described character wherein the environmental cover is of yieldable shape-retaining nature and is in a first operative position yieldably secured to the structural member on an outboard side thereof while being non-yieldably secured to the structural member on an inboard side thereof. The cover in a second operative position separating from the outboard side of the structural member to extend upwardly in fence-like manner from the inboard side of the structural member, and directing the inflating flotation bladder outwardly of the helicopter.

Additionally, the present invention provides a helicopter flotation pack wherein the flotation bladder defines a pair of spaced apart Y-shaped girts depending therefrom for attachment to opposite sides of the structural member. In cooperation, the structural member defines an upper portion extending upwardly between the pair of Y-shaped girts in conforming relationship thereto to define an upper engagement surface engaging a portion of the flotation bag which when inflated is subject to hoop-stress inflation forces.

Among the advantages of the present invention, a chief advantage is the reduction of helicopter downtime occasioned for installation, inspection, and maintenance of the flotation system according to the invention in comparison with conventional flotation systems. Further, the flotation pack, because it is spaced somewhat above the landing skid by the structural member, has a reduced exposure to abrasion, puncture, or contamination by foreign matter or water from a landing pad or field. The pack may also be packed in a more controlled environment away from the helicopter hanger rather than on the hanger floor as with conventional flotation systems.

A further advantage of the present invention results from the yieldable shape-retaining environmental cover. Because the pack is disposed upon the helicopter landing skid during flight, the aerodynamics of the helicopter are influenced by the aerodynamic drag of the flotation pack. The present invention has a predictable and controlled shape which may be selected to minimize adverse aerodynamic effects upon the helicopter. On the other hand, the aerodynamics of conventional flotation systems were somewhat unpredictable because their shape and size can vary with the skill of the packer.

On the other hand, when the flotation bags of the present invention are deployed, another advantage of the shape-retaining environmental cover becomes apparent. During inflation of the flotation bags, the shape-retaining nature of the environmental cover as well as its disposition generally between the helicopter fuselage and float bag substantially eliminates the possibility of the flotation bag moving or being blown between the fuselage and landing skid.

Yet another advantage of this invention is the stabilizing influence exerted upon the flotation bag by the cooperation of the pair of spaced apart Y-shaped girts straddling an interaction area wherein hoop-stress inflation forces of the bag itself cooperate with the structural member to tension the girts. A concomitant advantage of the inventive Y-shaped girts is that the connection between the flotation bag and each girt is much stronger than conventional T-shaped girt structures. Accordingly, the overall attachment of each flotation bag to the helicopter is made stronger and more stable than conventional flotation bags.

DETAILED DESCRIPTION OF THE PREFERRED EMBODIMENT OF THE INVENTION

Figure 1:
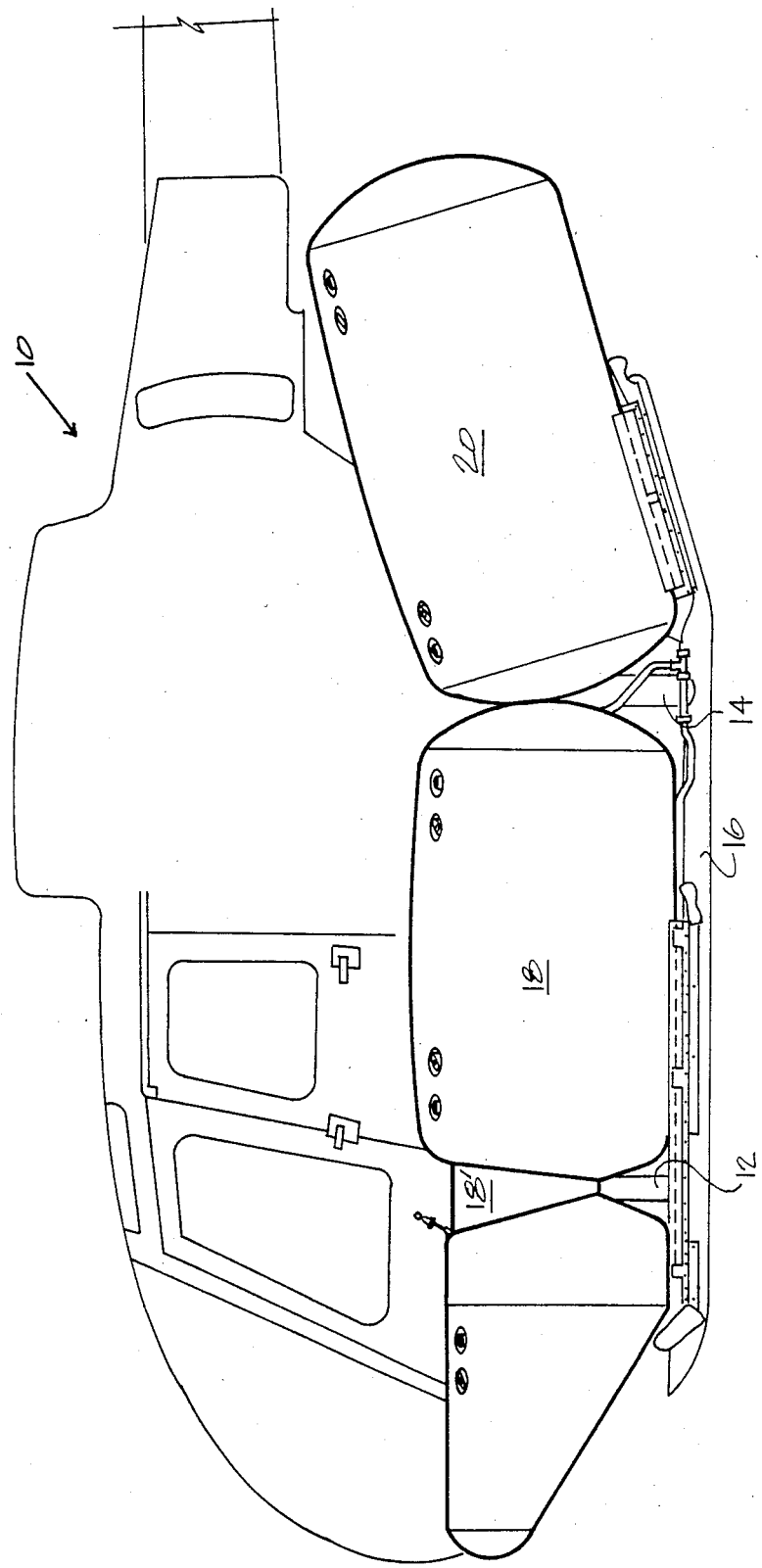
FIG. 1 is a fragmentary left-side elevation view of an exemplary helicopter having float bags according to the invention attached thereto and inflated for buoyantly supporting the helicopter.

With reference to FIG. 1, a helicopter 10 is provided with a fore and an aft cross tube 12 and 14, respectively, from which depend a pair of longitudinal landing skids, only the left-hand landing skid 16, being illustrated. Disposed upon the landing skid 16 is a pair of inflated flotation bags 18, 20, which may provide buoyancy for the helicopter in the event the latter is forced to land or ditch on water. A substantially identical pair of flotation bags (not illustrated) are attached to the right-hand landing skid. Because the right-hand and left-hand landing skids and flotation bags are substantially mirror images of one another, only the left-hand side will be described, it being understood that matching structure is also provided on the right-hand side of helicopter 10.

Figure 2:
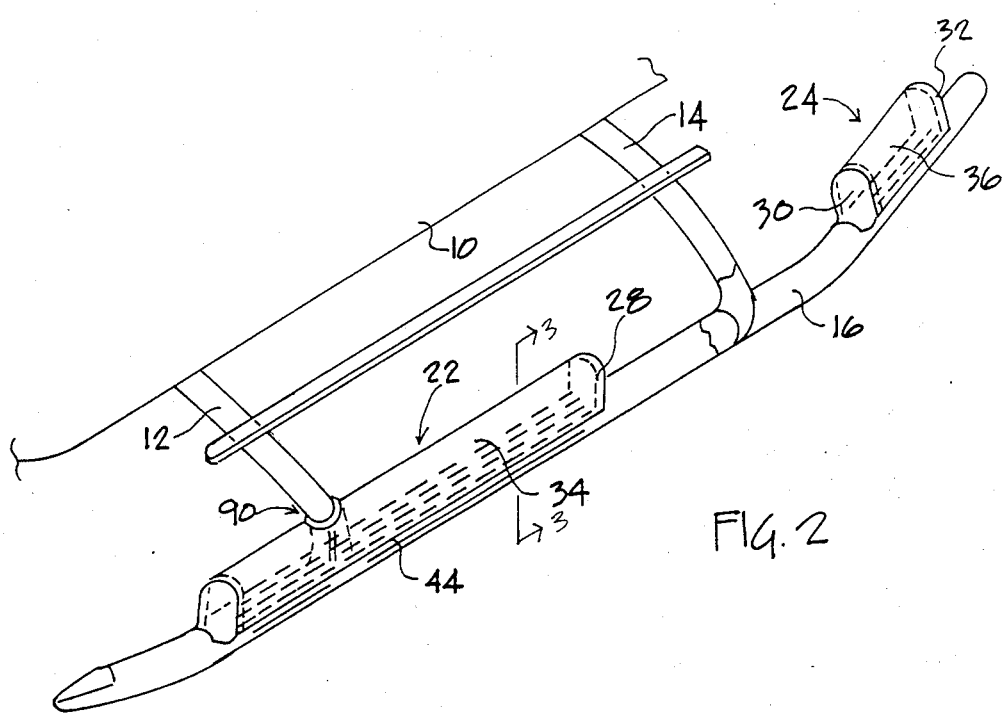
FIG. 2 is a fragmentary perspective view of one of the pair of landing skids of the helicopter depicted by FIG. 1, and having the float bags deflated and packed within environmental and cosmetic covers of the float packs.
Figure 3:
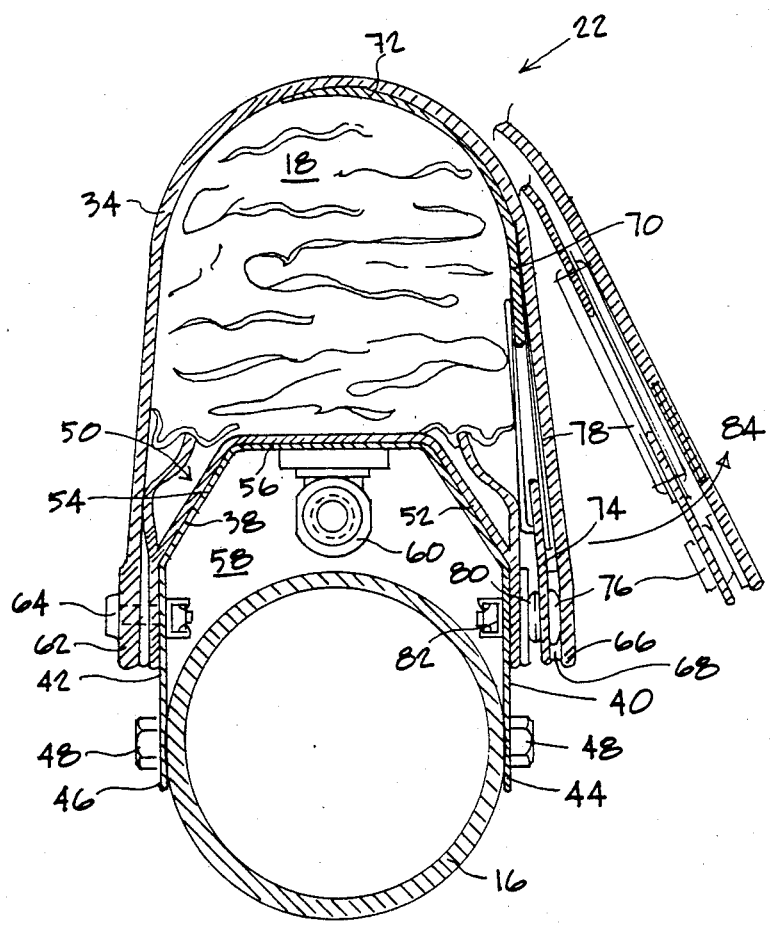
FIG. 3 is a transverse cross sectional view taken along the line 3—3 of FIG. 2, and looking in the direction of the arrows, with the environmental cover also shown in an intermediate operative position preparatory to flotation bag inflation.

Turning now to FIGS. 2 and 3, it will be seen that the flotation bags 18 and 20 are normally carried deflated and packed within respective pack assemblies 22 and 24 which are carried upon the upper surface of the landing skid 16. The exterior surfaces of each pack assembly 22 and 24 are defined by respective elastomeric aerodynamic end caps 26, 28, 30, and 32, in cooperation with elongate longitudinal environmentally protective and cosmetic cover members 34 and 36.

FIG. 3 illustrates that each pack assembly 22, 24 includes also an elongate structural member 38 extending between the respective end caps 26–32. The structural member 38 is generally of inverted U-shape and includes a pair of spaced apart leg portions 40, 42 disposed on opposite sides of the landing skid 16. Each of the leg portions 40, 42 define respective lower marginal edge sections 44, 46 which are visible below the environmental cover 34, viewing FIG. 3. The marginal edge sections 44, 46 define a plurality of spaced apart apertures (not visible) for receiving fasteners 48 engaging the landing skid 16.

Structural member 38 also includes a transverse portion 50 defining a pair of angularly disposed shoulder sections 52 and 54, as well as a generally horizontal flotation bag engagement section 56. Also, upon inspection of FIG. 3, it will be seen that the U-shaped structural member 38 cooperates with landing skid 16 to define a chamber 58. The chamber 58 receives conduits (partially visible in FIG. 1) as well as connections, one of which referenced with numeral 60 is visible on FIG. 3, for inflating the flotation bag 18. Also, the chamber 58 by its vertical dimension adds to the spacing of the flotation bag 18 above the lower ground engaging surface of the landing skid 16.

Those skilled in the pertinent art will recognize that spacing the flotation pack above the landing skid lower surface can have a very beneficial effect when a helicopter is landed upon a soft, and perhaps wet, field into which the landing skid may sink a few inches. Conventional landing skid mounted flotation systems may be water soaked and mud encrusted as a result of only one such landing. Of course, passenger confidence in such conventional flotation equipment is not well preserved when it is seen to be in such condition. The present invention substantially prevents such occurrences and also eliminates the resulting helicopter downtime required for cleaning.

FIG. 3 also illustrates the attachment of the cover member 34 at one end margin 62 thereof to the inboard (leftward viewing FIG. 3) side of the structural member 38 by a plurality of fasteners 64, only one of which is illustrated. The cover member 34 at its opposite end margin 66 is secured by a hook-and-loop fastener 68 to a lacing strap 70 which is also permanently secured to the cover member in a region 72 intermediate of the two end margins 62, 66. The lacing strap 70 includes an end portion 74 which carries a plurality of inwardly directed snap fasteners halves 76 (only one of which is illustrated by FIG. 3) and also carries an outwardly directed half of the loop-and-hook fastener 68. An adjustable lacing section 78 connects the end portion 74 to the remainder of the lacing strap 70 and cover member 34. The structural member 38 at leg 44 thereof carries a plurality of outwardly directed snap fastener halves 80 which are secured thereto by fasteners 82, the fastener halves 80 being best illustrated viewing FIG. 4. During packing of the flotation bag 18, the lacing strap 70 is connected to structural member 38 by snap fasteners 76, 80, and the lacings 78 are drawn tight to compress the deflated and folded bag 18 into the desired shape and size. Subsequently, the end margin 66 of cover member 34 is secured by the hook-and-loop fastener 68 to complete the environmental and cosmetic covering of the flotation bag 18.

FIG. 3 also depicts the cover member 34 in an intermediate operative position which it will occupy during inflation of the flotation bag 18. It will be understood that inflation of flotation bag 18 is effected by providing pressurized inflation gas to the interior thereof via fitting 60. The expansionary inflation forces created within the folded flotation bag 18 consequently pop loose the snap fasteners 76, 80 so that the cover member 34 is freed from structural member 38 on the outboard side thereof (rightwardly viewing FIG. 3), as is indicated by arrow 84. However, the cover member 34 is of yieldable shape-retaining nature so that the inflating flotation bag 18 must force its way outwardly from within the pack 22. As a result, the inflating flotation bag 18 is during inflation directed outwardly away from the fuselage of helicopter 10 by cover member 34.

Figure 4:
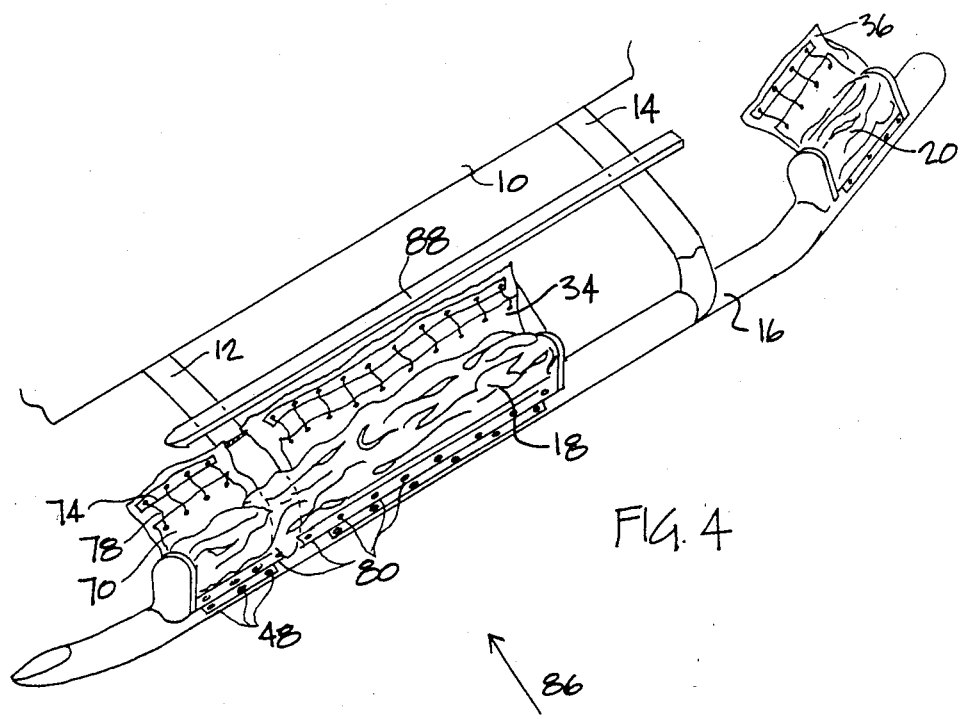
FIG. 4 is a fragmentary perspective view similar to FIG. 2, and depicting the environmental cover of the flotation packs in a fence-like operative position.

FIG. 4 depicts the cover member 34 in a fence-like position which it may reach during inflation of the flotation bag 18 while exposed to a cross wind (arrow 86) tending to blow the bag 18 under the helicopter 10, or upon full inflation of the bag 18. It will be noted viewing FIG. 4 that for clarity of illustration the flotation bag 18 is depicted at a very early stage of inflation. In fact, the flotation bag 18 at such an early stage of inflation is directed outwardly away from the fuselage of helicopter 10, as explained with reference to FIG. 3, and is not free to expand upwardly as FIG. 4 may suggest. However, FIG. 4 clearly illustrates the cooperation of cover member 34 with cross tube 12 and with a step member 88 extending longitudinally between the cross tubes 12, 14 to effectively prevent the flotation bag from moving between the helicopter fuselage and landing skid 16.

In order to complete this description of the flotation pack 22 it must be noted that, as FIG. 2 depicts, the pack 22 defines an inwardly opening recess 90 which received or straddles the forward cross tube 12. While it is apparent that the cross tube 12 does encroach upon the packing space within pack 22 for flotation bag 18, FIG. 1 illustrates the neck portion 18' which is defined by bag 18 in order to clear cross tube 12. Because the neck portion 18' has substantially less bulk when deflated than the remainder of flotation bag 18, the space within the pack 22 is adequate to receive the deflated flotation bag 18. The recess 90 and neck portion 18' allow both the flotation pack 22 and the inflated flotation bag 18 to traverse the cross tube 12.

Figure 5:
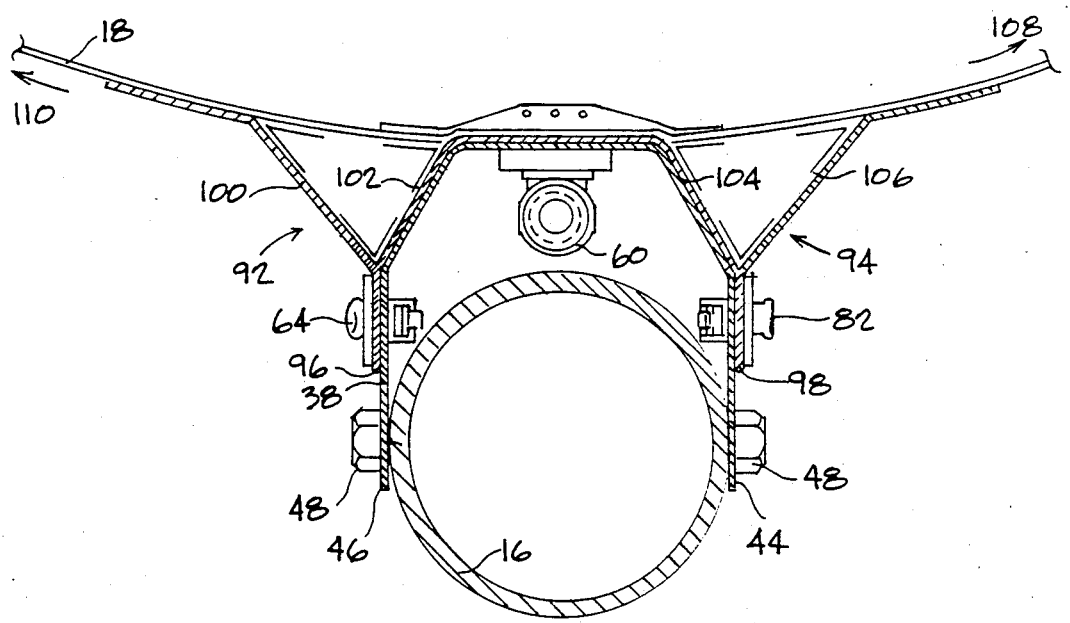
FIG. 5 is a fragmentary transverse cross sectional view somewhat similar to FIG. 3, showing the inflated flotation bag in cooperation with the structural member of the flotation pack, and having parts omitted for clarity of illustration.

FIG. 5 depicts the fully inflated flotation bag 18 and cooperating structural member 38. The environmentally protective and cosmetic cover member is omitted from FIG. 5 for clarity of illustration. Viewing FIG. 5, it will be seen that flotation bag 18 includes and defines a pair of elongate flexible girts 92, 94 which when the bag 18 is fully inflated are generally Y-shaped in cross section. Each of the girts 92, 94 include respective end margin sections 96, 98 which are secured to the structural member 38 by the fasteners 64, 82, respectively. Extending between the end margin sections 96, 98 and the remainder of the flotation bag 18 are girt legs 100, 102, 104, and 106. It will be noted that girt legs 102, 104 intimately engage the angular shoulder sections 52, 54 of structural member 38. Further, it must be noted that the flotation bag 18 is subject to hoop-stress inflation forces, which are represented by arrows 108, 110. These inflation forces, create tension forces which prestress the girt legs 100, 102, 104, and 106. Additionally, the structural member 38 at section 56 protrudes upwardly to deflect the bag 18 from the circular shape it otherwise would assume due to the inflation pressure therein. As a result, the girt legs 102 and 104 are also prestressed in tension. As a consequence of these prestressing tension forces originating with inflation forces within the flotation bag 18, flutter of the latter during flight of the helicopter 10 is reduced or eliminated. It will be recognized that the tension forces applied to the girts 92, 94 by inflation forces of the bladder 18 are of the same sense as buoyancy forces transferred through the girts when the helicopter is afloat upon a body of water. In other words, the inventive helicopter flotation apparatus achieves an improved in-flight bladder stability by opposing inflation forces at section 56 with potential buoyancy forces at girts 92, 94.

While the present invention has been depicted and described by reference to one particularly preferred embodiment of the invention, such reference does not imply a limitation upon the invention, and none is to be inferred. The invention is intended to be limited only by the scope and spirit of the appended claims, which also provide a definition of the invention.

We claim:

1. Helicopter flotation apparatus comprising:
   an elongate structural member including means for removable attachment thereof to a helicopter landing skid, means for securing an inflatable flotation bladder thereto, and means for spacing said flotation bladder apart from and generally above said landing skid;
   an inflatable flotation bladder securing to said structural member at said means therefor, said flotation bladder includes a spaced apart pair of Y-shaped girt means respectively securing to an inboard side and to an outboard side of said structural member at respective distal end margins thereof, said girt means upon inflation of said flotation bladder being substantially Y-shaped in transverse cross section with a pair of divergent legs spaced apart at their respective union with said flotation bladder, and said pair of legs converging to terminate in a single distal end margin; and
   enviornmentally protective cover means for in a first position thereof cooperating with said structural member to substantially define an envelope receiving said flotation bladder deflated and folded therewithin.

2. The invention of claim 1 wherein said structural member further cooperates with said landing skid to define an elongate chamber between the latter and said flotation bladder.

3. The invention of claim 2 further including inflation means for said flotation bladder disposed within said chamber.

4. The invention of claim 1 wherein said structural member defines an inboard side and an outboard side with respect to said helicopter, said cover means defining a pair of opposite edge margins and being secured at one of said pair of edge margins to said inboard side of said structural member, said structural member and the other of said pair of edge margins defining cooperating means for releasable intersecurement at said outboard side in said first position of said cover member and for releasing said intersecurement in response to inflating of said flotation bladder.

5. The invention of claim 4 wherein said cover member is of yieldable shape-retaining nature tending toward said first position thereof.

6. The invention of claim 5 wherein said cover member in response to inflating of said flotation bladder releasing said intersecurement thereof with said structural member outboard side moves toward a second position thereof extending generally upwardly from said structural member inboard side in fence-like manner to direct said inflating flotation bladder outwardly of said helicopter.

7. Helicopter flotation apparatus comprising:
an elongate structural member including means for removable attachment thereof to a helicopter landing skid, means for securing an inflatable flotation bladder thereto, and means for spacing said flotation bladder apart from and generally above said landing skid;
an inflatable flotation bladder securing to said structural member at said means therefor;
environmentally protective cover means for in a first postion thereof cooperating with said structural member to substantially define an envelope receiving said flotation bladder deflated and folded therewithin; and
an elastomeric aerodynamic end cap at each end of said structural member.

8. The invention of claim 7 wherein said structural member further cooperates with said landing skid to define an elongate chamber between the latter and said flotation bladder.

9. The invention of claim 8 further including inflation means for said flotation bladder disposed within said chamber.

10. The invention of claim 7 wherein said structural member defines an inboard side and an outboard side with respect to said helicopter, said cover means defining a pair of opposite edge margins and being secured at one of said pair of edge margins to said inboard side of said structural member, said structural member and the other of said pair of edge margins defining cooperatiing means for releasable intersecurement at said outboard side in said first position of said cover member and for releasing said intersecurement in response to inflating of said flotation bladder, 11. The method of providing buoyant flotation for a helicopter including the steps of:
providing an elongate structural member configured for securement to a landing skid of said helicopter, and including means for interconnecting with an inflatable flotation bladder while spacing the same generally above said landing skid;
providing an environmentally protective cosmetic cover member joined with said structural member so as to define an envelope for receiving said bladder deflated therein;
interconnecting an inflatable floation bladder with said structural member at said means therefor, said interconnecting step including the steps of providing said flotation bladder with an elongate generally Y-shaped girt having a pair of divergent legs spaced apart at respective unions with the remainder of said bladder and converging to define a single edge margin, and securing said edge margin to said structural member;
providing a spaced apart pair of said Y-shaped girts, and securing the respective edge margins of said pair of girts to opposite sides of said structural member;
packing said flotation bladder deflated into said envelope apart from said helicopter; and
securing said structural member carrying said packed flotation bladder within said cover member to said helicopter landing skid.

12. The method of claim 11 further including the steps of providing said structural member with a pair of angulated shoulder sections, and engaging each of said pair of shoulder sections with a respective leg of said pair of Y-shaped girts.

13. Helicopter modular flotation apparatus comprising:
an elongate base member including means for interconnecting with a helicopter landing skid, and means for intersecuring all other elements of said modular apparatus thereto;
an environmentally protective elongate cosmetic cover member intersecuring with said base member to define an envelope in cooperation therewith, said cover member defining a pair of opposite edge margins one of which is attached to said base member, the other of said edge margins removably securing also to said base member;
an inflatable flotation bladder defining a pair of spaced apart girt means securing to said base member adjacent said opposite edge margins, each of said pair of girt means including a pair of elongate divergent webs spaced apart at respective substantially parallel unions with said bladder, said pair of webs converging to define a respective single elongate edge margin, and each edge margin of said pair of girt means defining means for intersecuring with said base member.

14. The invention of claim 13 wherein said base member is cooperable with said landing skid to define an elongate chamber between the latter and said flotation bladder.

15. The invention of claim 14 wherein said flotation apparatus further includes means for inflating said flotation bladder disposed within said elongate chamber.

16. The invention of claim 13 wherein said other edge margin of said cover member secures to said base member at an outboard side of the latter with respect to said helicopter landing skid.

17. The invention of claim 16 wherein said cover member is of yieldable shape-retaining character tending toward a position of envelopment of said flotation bladder, said cover member upon inflation of said flotation bladder moving to a fence-like position inboard of said flotation bladder with respect to said helicopter landing skid.

18. Helicopter modular flotation apparatus comprising:
an elongate base member of generally U-shaped transverse cross section having a generally parallel pair of spaced apart depending legs, and a transverse portion therebetween defining a pair of angulated shoulder sections, with the remainder of said transverse portion being generally perpendicular to said pair of legs, a lower marginal edge section of each of said pair of legs including means for interconnection with a helicopter landing skid;
an inflatable flotation bladder defining a pair of spaced apart elongate girts which are generally Y-shaped in transverse cross section, each of said pair of girts including a pair of divergent elongate webs which are spaced apart at respective substantially parallel unions with the remainder of said flotation bladder, said pair of webs converging remote from the remainder of said flotation bladder to define an elongate distal edge margin, each edge margin of said pair of girts defining means for attachment to a respective one of said pair of base member legs;

an elongate yieldable shape-retaining and environmentally protective cover member defining a pair of opposite edge margins, one of said pair of edge margins being secured to a respective of said pair of base member legs, the other of said pair of edge margins defining means for removable attachment to the other of said pair of base member legs to dispose said cover member in a first position cooperating with said base member to substantially define an envelope for receiving said flotation bladder deflated therein, said other cover member edge margin separating from said base member in response to inflating of said flotation bladder to resistingly move to a second position wherein said cover member extends generally upward fence-like from said one base member leg to direct said inflating flotation bladder outwardly thereof.

said base member transverse portion further defining a flotation bladder engagement section intermediate said pair of angulated shoulders for upon inflating of said flotation bladder deflecting the latter from its unrestrained shape to prestress said girts in tension, said angulated shoulder sections thereupon engaging a respective one web of each of said pair of Y-shaped girts; and a pair of aerodynamically shaped end caps disposed adjacent opposite ends of said base member and cooperating therewith and with said cover member to envelope said flotation bladder when deflated.

19. The invention of claim 18 wherein said base member is further cooperable with said landing skid to define an elongate chamber between and spacing apart the latter and said flotation bladder, and means for inflating said flotation bladder disposed within said elongate chamber.

20. Helicopter flotation apparatus comprising:
an elongate structural member including means for removable attachment thereof to a helicopter landing skid, means for securing an inflatable flotation bladder thereto, and means for spacing said flotation bladder apart from and generally above said landing skid;
an inflatable flotation bladder securing to said structural member at said means therefor;
environmentally protective cover means for in a first position thereof cooperating with said structural member to substantially define an envelope receiving said flotation bladder deflated and folded therewithin;
wherein said flotation bladder includes girt means for securing to said structural member, said girt means upon inflation of said flotation bladder being substantially Y-shaped in transverse cross section with a pair of divergent legs spaced apart at their respective union with said flotation bladder, and said pair of legs converging to terminate in a single distal end margin;
wherein said flotation bladder includes a spaced apart pair of said Y-shaped girt means respectively securing to an inboard side and to an outboard side of said structural member at respective distal end margins thereof; and
wherein said structural member includes a transverse portion interconnecting a spaced apart pair of legs and cooperating therewith to space said flotation bladder above said landing skid.

21. The invention of claim 20 wherein said transverse portion defines a pair of spaced apart angulated shoulder sections adjacent respective ones of said pair of legs and each engaging a respective leg of said pair of girt means.

22. The invention of claim 21 wherein said transverse portion also defines a flotation bladder engagement section interconnecting said pair of angulated shoulder sections and upon inflation of said flotation bladder deflecting the latter from its unrestrained shape to prestress said pair of girt means in tension.

23. The method of providing buoyant flotation for a helicopter including the steps of:
providing an elongate structural member configured for securement to a landing skid of said helicopter, and including means for interconnecting with an inflatable flotation bladder while spacing the same generally above said landing skid;
providing an environmently protective cosmetic cover member joined with said structural member so as to define an envelope for receiving said bladder deflated therein;
interconnecting an inflatable flotation bladder with said structural member at said means therefor;
packing said flotation bladder deflated into said envelope apart from said helicopter;
securing said structural member carrying said packed flotation bladder within said cover member to said helicopter landing skid;
wherein said step of interconnecting an inflatable flotation bladder with said structural member includes further the steps of providing said flotation bladder with an elongate generally Y-shaped girt having a pair of divergent legs spaced apart at respective unions with the remainder of said bladder and converging to define a single edge margin, and securing said edge margin to said structural member;
further including the steps of providing a spaced apart pair of said Y-shaped girts, and securing the respective edge margins of said pair of girts to opposite sides of said structural member;
further including the steps of providing said structural member with a pair of angulated shoulder sections, and engaging each of said pair of shoulder sections with a respective leg of said pair of Y-shaped girts; and
further including the steps of providing said structural member with a flotation bladder engagement section intermediate of said angulated shoulders, and engaging said engagement section with said flotation bladder to prestress said pair of girts in tension.

24. Helicopter flotation apparatus for removable attachment to a helicopter landing skid, said apparatus comprising:
a fluid distensble flotation bladder;
a structural member adapted to be removably attached generally above a helicopter landing skid;

a pair of spaced Y-shaped girt members extending from said flotation bladder for attachement to said structural member, said girt members having a pair of divergent spaced apart legs secured to said flotation bladder with said pair of legs converging to a single distal end for attachment to said structural member; and cover means disposed above said structural member to enclose said uninflated flotation bladder therein.

* * * * *